Oct. 1, 1963     L. D. EDWARDS     3,105,521
COMBINED STOPPING MACHINE FOR SERVICE T AND SERVICE TESTER
Filed Aug. 28, 1961     2 Sheets-Sheet 1
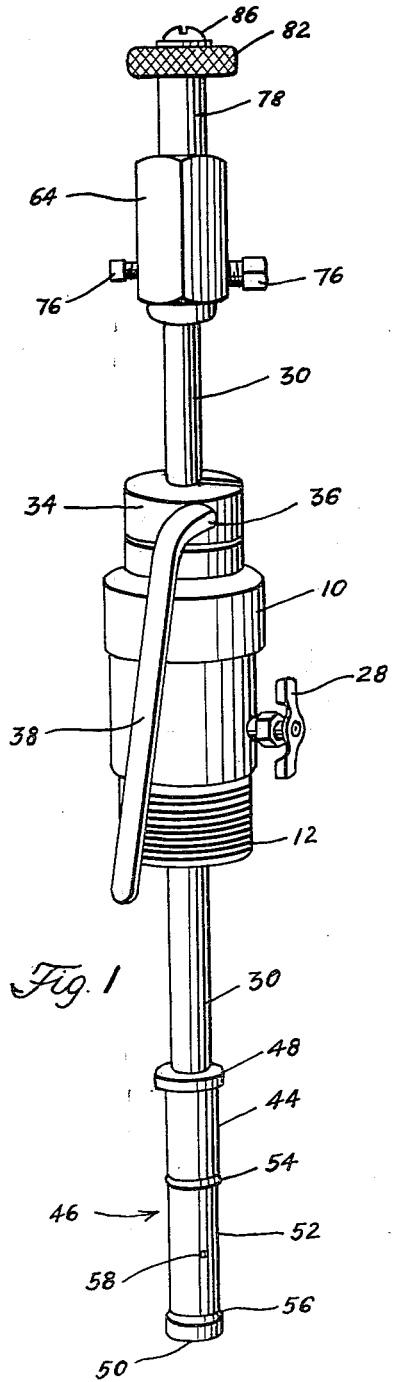
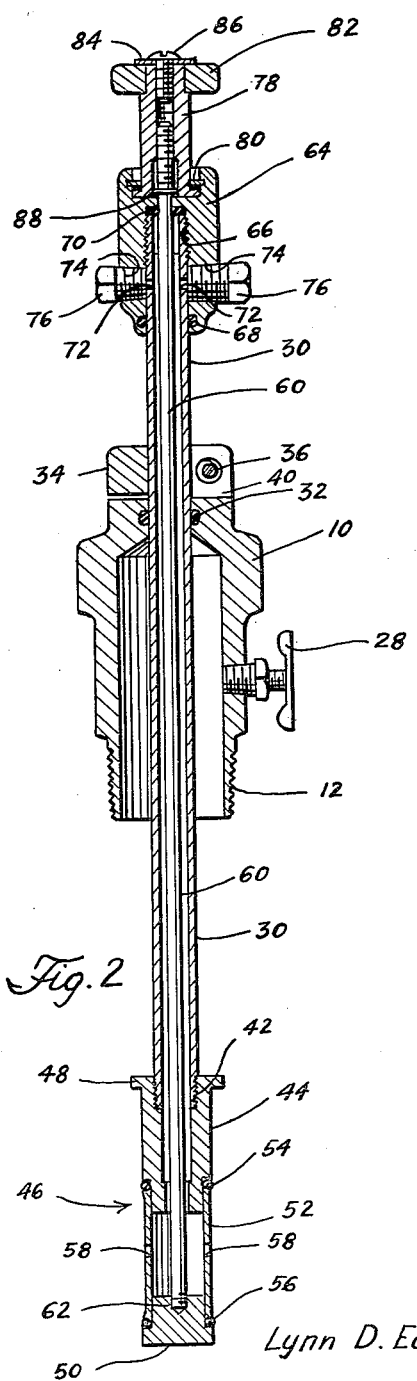
INVENTOR
Lynn D. Edwards
BY Cushman, Darby & Cushman
ATTORNEY

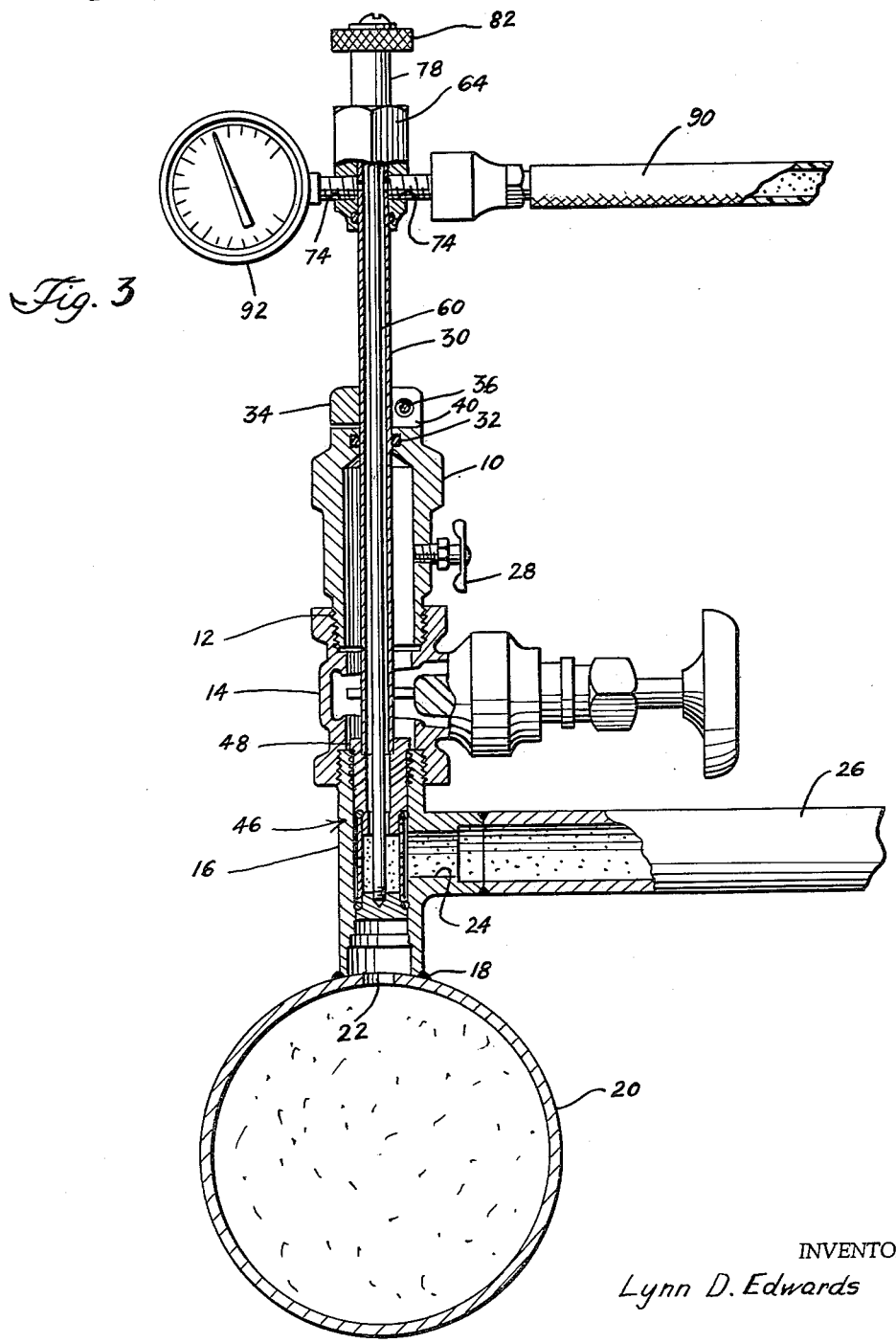

United States Patent Office 3,105,521
Patented Oct. 1, 1963

3,105,521
COMBINED STOPPING MACHINE FOR SERVICE T AND SERVICE TESTER
Lynn D. Edwards, Decatur, Ill., assignor to Mueller Co., Decatur, Ill., a corporation of Illinois
Filed Aug. 28, 1961, Ser. No. 134,226
6 Claims. (Cl. 138—90)

This invention relates to improvements in pipe stopper apparatus particularly adapted for use with service T's to temporarily shut off flow therethrough for various purposes, e.g., so that the service line can be repaired or replaced. More especially this invention pertains to improvements in service T stoppers of the type disclosed in the patent to Hutton, No. 2,793,783.

That patent discloses a service T stopper which makes use of O-rings as sealing elements for engagement with the interior of the T bore. In use of the stopper, the O-rings are subjected to mechanical compression in order to effect their radial sealing expansion, and a compression spring is carried by the stopper for biasing the mechanical elements out of compressing engagement with the O-rings. While this apparatus has enjoyed varying degrees of success, difficulties attend its use. In particular, it has been found that such a stopper has a tendency to expand and seal prematurely under certain sizes and conditions, e.g., a ¾ inch stopper at 100 p.s.i., and thereby prevent full effective insertion of the stopper into the T. This difficulty occurs because the leading or lower O-ring has only a very small clearance with the T bore. Such construction causes the O-ring to drag on the wall of the T bore a sufficient degree to cause a slight radial expansion of the O-ring. As a result of such expansion and the existence of line pressure in the T, the O-ring will immediately seal with the wall of the T bore, thereby even further expanding the O-ring so that it will substantially lock the stopper in the bore, precluding further movement. Such an expansion is accentuated because the entire stopper is pushed into a T bore by an outer manipulating tube, so that any drag on the leading O-ring causes the spring to yield and the O-ring to become compressed mechanically, with consequent lateral expansion thereof against the T wall.

Accordingly, this invention has reference to a new and improved service T stopper of the character described which provides a positive two-way control of the mechanical compression of the O-rings, thereby obviating the undesirable shortcomings of a spring-biased means for normally maintaining mechanical compressing parts out of engagement with the O-rings.

After a service line has been repaired or replaced as described above, it is desirable to pressure test the same, usually with air, before service is re-established by removing the stopper. The stopper disclosed in the above-mentioned Hutton patent, however, makes no provision to facilitate the introduction of a testing fluid into the service line.

Accordingly, it is another object of this invention to provide service T stopping apparatus which facilitates the introduction of a testing fluid into a service line while the stopper is effective to shut off flow through the service T.

These and still further objects, advantages, and novel features of the present invention will become apparent in the specification and claims, taken in connection with the accompanying drawings.

In the drawings:
FIGURE 1 is a perspective view of service T stopping apparatus embodying the present invention;
FIGURE 2 is a longitudinal sectional view of the apparatus shown in FIGURE 1; and,
FIGURE 3 is a vertical sectional view showing the apparatus in use and stopping off flow through a service T.

Referring now to the drawings, the service T stopping apparatus embodying this invention shown therein includes the usual stopper bell or barrel 10 having an open lower end adapted for connection, as by threads 12, to the upper end of an appropriate valve, e.g., a gate valve 14, as illustrated in FIGURE 3 of the drawings. The lower end of the valve is connected to the upper end of a service T 16 which has its lower inlet end secured in the usual manner, as by welding 18, to a main 20. Subsequent to the securement of the T to the main, a hole 22 was formed in the latter to provide for flow from the main 20 into the inlet end of the T 16, through the lateral outlet 24 of the T 16, and into a service line 26, which is secured to the T 16, as by welding.

Normally, the upper end of the T 16 is closed by a threaded closure plug (not shown) and also is provided with a closure cap (not shown) engaged with exterior threads on the upper end of the T 16. In order to use stopping apparatus with the T 16, however, the closure cap is removed, the valve 14 secured to the upper end of the T, and by means of appropriate extracting apparatus (not shown) well known in the art, which is secured to the upper end of the valve 14, and which operates therethrough, the closure plug is removed. Thereafter, the extracting apparatus is disconnected and removed from the upper end of the valve 14, so that the stopper bell 10 can be connected to the valve 14, as shown in FIGURE 3. Preferably, for reasons later explained, the side of the bell 10 is provided with a manually-operable bleeder valve 28 communicating with the interior of the bell 10.

Slidably extending through a concentric bore in the upper or closed end of the bell 10 is a stopper inserting and manipulating tube 30. A seal is effected between the bell 10 and the tube 30, as by means of an O-ring 32 disposed in a circumferential groove in the bell bore and engaged with the exterior surface of the tube. In order to maintain the tube 30 in any desired position of axial adjustment with respect to the bell 10, the tube, immediately above the bell, is embraced by a split clamping collar 34 having an operating screw 36 threaded into one of the opposed ends of the collar and bearing against an interior shoulder on the other in order to expand or contract the collar. The screw 36 preferably is provided with an integral elongated right-angled handle 38. The collar 34, at the underside of one end thereof, may be formed integrally, as at 40, with the upper end of the bell 10, or otherwise appropriately secured thereto. As illustrated in the drawings, the clamping collar 34 essentially is an integral part of the stopper bell 10 and is formed by cutting operations on an integral extension of such bell.

The lower end of the tube 30 is appropriately secured, as by a threaded connection 42, to the upper end of a centrally bored cylindrical metal plug-like member 44 constituting an upper compressive member of a stopper 46. At its upper end, the member 44 is provided with an exterior peripheral flange 48 adapted to seat against the upper end of the T 16, as shown in FIGURE 3, to insure proper insertion of the stopper 46 thereinto. The diameter of the member 44 below the flange 48, is only slightly less than that of the bore of the T 16.

The stopper 46 also includes a lower plug-like metal compressive member 50 of substantially the same exterior diameter as that of the upper member 44. The adjacent ends of the members 44 and 50 are reduced in diameter and slidably and snugly telescoped into the opposite ends of a metal sleeve 52 of substantially the same exterior diameter as that of the plug members. Interposed between the opposite ends of the sleeve 52 and corresponding shoulders formed on the members 44 and 50 by reason of their reduced adjacent ends are O-rings 54 and 56 of an exterior diameter, when relaxed, preferably slightly greater than that of the plug members 44 and 50 but not appreciably exceeding and desirably slightly less than the interior diameter of the bore of the T 16. The O-rings 54 and 56 are spaced apart a distance which will dispose the rings on opposite sides of the lateral outlet 24 of the service T 16 when the stopper 46 is inserted thereinto. Preferably, and for reasons later apparent, the sleeve 52 is provided, between the adjacent ends of the plug-like members 44 and 50, with a plurality of radial ports 58 to communicate the interior of the sleeve with the service line 26 when the stopper 46 is in place in the T 16, as shown in FIGURE 3.

From the foregoing construction, it will be seen that when the stopper 46 is inserted in the T 16 and the two members 44 and 50 are urged toward each other, the O-rings 54 and 56 will be compressed between the ends of the sleeve 52 and the shoulders on the members to thereby laterally expand the O-rings into sealing engagement with the walls of the bore of the T. The sealing engagement of the lower O-ring 56 with the T bore and also with the lower member 50, will effectively shut off flow from the main 20 to the T lateral outlet 24. Similar lateral expansion of the upper O-ring 54 will preclude flow from the service line 26 into the interior of the stopper bell 10.

In order to urge the stopper members 44 and 50 towards each other, to effect expansion of the O-rings 54 and 56, or allow the members 44 and 50 to move away from each other to permit the O-rings to relax, a draw rod 60 has its lower end secured, as by threaded engagement 62, to the lower stopper member 50 and extends coaxially upwardly through the bore in the upper member 44 and through the manipulating tube 30. Obviously, upward movement of the rod 60 relative to the tube 30 mechanically compresses and thus effects lateral expansion of the O-rings 54 and 56.

Snugly fitted over the upper end of the tube 30 is a centrally-bored manipulating head 64 provided with threads 66 at the inner end of a downwardly facing counterbore engaged with corresponding exterior threads on the upper end of the tube 30 so as to secure the head thereto. The head 64 is sealed to the tube 30, as by means of an O-ring 68 disposed in a circumferential groove in the head adjacent the mouth of the counterbore and snugly embracing the exterior of the tube. Preferably, a seal is effected between the inner end of the tube 30 and the draw rod 60 as by an O-ring 70 interposed between the end of the tube and the shoulder at the inner end of the counterbore and snugly embracing the rod. For reasons later explained, the tube 30 is provided with one or more radial ports 72 within the counterbore, and the head 64 is provided with at least two enlarged radial ports 74 communicating with the tube ports, such head ports normally being closed by threaded closure plugs 76.

The draw rod 60 extends out of the upper end of the tube 30, and through the head 64 and has its upper end threadedly engaged with an operating or control nut 78. The nut 78 has a lower flanged end rotatably received within a counterbore in the upper end of the head 64. The nut 78 is held in place in the counterbore, as by means of a snap ring 80 engaged within a circumferential groove in the counterbore and overlying the flange on the nut, thus swivelly securing the nut to the head 64. The upper end of the nut 78 is reduced and provided with a noncircular configuration for engagement within a complementary opening in an operating knob 82 preferably having a knurled exterior surface. The knob 82 is secured to the nut 78, as by means of a retaining washer 84 and retaining screw 86 threaded into the upper end of the nut. It readily will be seen that rotation of the nut 78 relative to the head 64 will effect reciprocation of the draw rod 60 to thus effect mechanical compression and lateral expansion of the stopper O-rings 54 and 56, or permit such rings to relax. In order to facilitate rotation of the nut 78 relative to the head 64, the latter is provided with a noncircular exterior configuration, best shown in FIGURE 1, for engagement by an appropriate rotation-restraining wrench (not shown). In order to prevent inadvertent detachment of the rod 60 from the nut 78, a snap ring 88 is secured to the rod within a counterbore in the lower end of the nut in position to engage the shoulder at the bottom of the upwardly facing counterbore in the head 64 after the rod is moved downwardly sufficiently to permit the O-rings 54 and 56 to relax.

In operation of the stopping apparatus, the gate valve 14 is first secured on the upper end of the T 16 and the closure plug (not shown) in the upper end of the latter is removed as aforedescribed. Thereafter, the stopper bell 10, with the stopper 46 retracted therein, is attached to the upper end of the valve 14. The valve 14 then is opened and the tube 30 pushed, by the head 64 or knob 82, so that the stopper 46 emerges from within the bell 10 and passes downwardly through the valve 14 and into the bore of the T 16. In this connection if the O-rings 54 and 56 should drag against the wall of the T bore and tend to expand laterally, such expansion will not be aggravated by any mechanical compression of the O-rings, so that the stopper 46 can easily be forced fully into the T bore by the tube 30. Downward movement of the stopper 46 is limited by engagement of the flange 48 with the upper end of the T 16 which serves to correctly position the stopper within the T bore so that the O-rings 54 and 56 are above and below the lateral outlet 24. With the stopper 46 thus positioned, the handle 38 is turned to contract the clamping collar 34 to tightly grip the tube 30 to thus maintain the stopper firmly fixed in the T bore so as to preclude the stopper from being forced outwardly by main pressure existing within the T 16. The knob 82 is then rotated in a direction to draw the rod 60 outwardly so as to effect mechanical compression of the O-rings 54 and 56 as aforedescribed. Such mechanical compression expands the O-rings 54 and 56 laterally, both radially inwardly and outwardly, so that they will seal with the walls of the T bore and with the upper and lower members 44 and 50 of the stopper 46. Of course, the exertion of main pressure on the lower O-ring 56 will serve to increase the effectiveness of the seal thereof, as is well-known in the art.

The effectiveness of the seal of the lower O-ring 56 to shut off flow from the main 20 to the lateral outlet 24 may be tested by removal of one of the closure plugs 76, while the effectiveness of the seal of the O-ring 54 to prevent communication between the main or service line and the interior of the stopper bell 10 can be tested by means of the bleeder valve 28.

After the purpose for which the shut-off was made has been fulfilled, e.g., the service line repaired or replaced, it frequently is desirable to pressure test the service line 26 for leaks before service is resumed by removal of the stopper 46. For this purpose, the closure plugs 76 in the head 64 may be removed, and a conduit 90 supplying fluid pressure, preferably compressed air, from an appropriate source, is connected to one of the threaded ports 74. A suitable pressure gauge 92 can be connected into the other threaded port 74. Thereupon, fluid under pressure from the conduit 90 can be introduced into the tube 30 so that it will flow down the annular space between the tube and the rod 60 and between the stopper member 44 and the rod into the interior of the sleeve 52 from whence it will pass through the radial ports 58 into the lateral outlet 24 of the T 16 and thence into the service line 26. By thereafter observing the pressure gauge 92, the existence or absence of a leak in the line 26 can be determined.

After the leak test has been performed, the pressure gauge 92 and conduit 90 can be detached from the head 64, the closure plugs 76 replaced in the threaded ports 74, the knob 82 rotated in a direction to release mechanical expansive engagement of the O-rings 54 and 56, the clamping collar 34 released, and the tube 30 pulled upwardly to thus establish service from the main 20 to the line 26. Once the stopper 46 is drawn within the stopper bell 10, the gate valve 14 can be closed so that the stopping apparatus, including the bell, can be removed from the valve 14, in order to enable a machine (not shown) to be connected to the valve for re-inserting a closure plug, in the upper end of the T 16.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A pipe stopper comprising: a cylindrical sleeve; a pair of circular plug-like members of substantially the same major outer diameter as said sleeve and provided with reduced end sections snugly telescoped within the opposite ends of said sleeve and annular shoulders facing said ends, one of said members being tubular; a resilient pressure-deformable packing ring interposed between each of said shoulders and the corresponding end of said sleeve, the outer diameter of each of said rings being slightly greater than the major outer diameter of said plug-like members and the inner diameter of each of said rings being of the order of the diameter of said reduced end sections; a manipulating tube fixedly secured coaxially to the outer end of said one member; and a draw rod extending coaxially within said tube, within said one member and within said sleeve with the inner end of said rod fixedly secured to the inner end of the other of said members.

2. The structure defined in claim 1 including an operating nut threadedly engaging the outer end of the draw rod, and means swivelly connecting said nut to the outer end of the tube.

3. The structure defined in claim 2 including interengageable abutment means carried by the rod and the tube for limiting the extent of inward movement of said rod relative to said tube to preclude disengagement between said rod and the nut.

4. The structure defined in claim 1 in which the sleeve is provided with at least one radial port intermediate its ends communicating with an annular passageway defined between the rod and the tubular member and between the rod and the tube, and including a seal between said rod and said tube adjacent the outer end of the latter to close the outer end of said passageway; and means defining a closable port in the outer end of said passageway connecting thereto for a source of fluid under pressure.

5. A pipe stopper comprising: a cylindrical sleeve; a pair of circular plug-like members of substantially the same major outer diameter as said sleeve and provided with reduced end sections snugly telescoped within the opposite ends of said sleeve and annular shoulders facing said ends, one of said members being tubular; a resilient pressure-deformable packing ring interposed between each of said shoulders and the corresponding end of said sleeve, the outer diameter of each of said rings being slightly greater than the major outer diameter of said plug-like members and the inner diameter of each of said rings being of the order of the diameter of said reduced end sections; a manipulating tube fixedly secured coaxially to the outer end of said one member; a draw rod extending coaxially within said tube, within said tubular member, and within said sleeve with the inner end of said rod connected to the inner end of the other of said members to exert a pull on the latter, said rod and said tubular member and tube defining an annular passageway communicating with the interior of said sleeve and the latter having at least one radial port intermediate its ends; means effecting a seal between said rod and tube adjacent the outer end of the latter; and means for connecting a source of fluid under pressure to said passageway adjacent the outer end thereof.

6. Releasable means for restraining relative axial movement between a cylindrical element and a member having a bore slidably carrying the element, comprising a split ring clamp coaxial with the bore and adapted to embrace the element, said clamp throughout a small angular segment thereof being integrally joined with said member, and screw means engaged with the adjacent ends of said clamp for effecting contraction thereof.

References Cited in the file of this patent

UNITED STATES PATENTS

| | | |
|---|---|---|
| 1,044,013 | Burnett | Nov. 12, 1912 |
| 1,326,435 | Boerner | Dec. 30, 1919 |
| 1,361,972 | Drake | Dec. 14, 1920 |
| 1,471,184 | Miles | Oct. 16, 1923 |
| 1,644,118 | Florence | Oct. 4, 1927 |
| 1,904,329 | Rich | Apr. 18, 1933 |
| 1,971,500 | Palmer | Aug. 28, 1934 |
| 2,053,734 | Ott | Sept. 8, 1936 |
| 2,299,116 | Svirsky | Oct. 20, 1942 |
| 2,481,013 | Henderson | Sept. 6, 1949 |
| 2,721,581 | Risley et al. | Oct. 25, 1955 |
| 2,784,627 | Mueller et al. | Mar. 12, 1957 |
| 2,793,783 | Hutton | May 28, 1957 |
| 2,899,983 | Farris | Aug. 18, 1959 |
| 2,905,194 | Smith | Sept. 22, 1959 |